United States Patent
Wu

(10) Patent No.: US 12,008,226 B2
(45) Date of Patent: Jun. 11, 2024

(54) IMAGE EDITING METHOD, STORAGE MEDIUM, AND TERMINAL DEVICE

(71) Applicant: GUANGDONG OPPO MOBILE TELECOMMUNICATIONS CORP., LTD., Guangdong (CN)

(72) Inventor: Henggang Wu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/933,254

(22) Filed: Sep. 19, 2022

(65) Prior Publication Data

US 2023/0013350 A1    Jan. 19, 2023

Related U.S. Application Data

(63) Continuation of application No. PCT/CN2021/073054, filed on Jan. 21, 2021.

(30) Foreign Application Priority Data

Mar. 18, 2020 (CN) .......................... 202010190562.2

(51) Int. Cl.
*G06F 3/048* (2013.01)
*G06F 3/0481* (2022.01)
(Continued)

(52) U.S. Cl.
CPC ........ *G06F 3/04845* (2013.01); *G06F 3/0481* (2013.01); *G06F 3/04842* (2013.01); *G06F 9/451* (2018.02); *G06F 16/54* (2019.01)

(58) Field of Classification Search
CPC ............... G06F 3/04845; G06F 3/0481; G06F 3/04842; G06F 9/451; G06F 16/54
See application file for complete search history.

(56) References Cited

U.S. PATENT DOCUMENTS 9,310,981 B2 * 4/2016 Lynch ................... G06F 40/134
9,665,930 B1    5/2017 Bedi et al.
(Continued)

FOREIGN PATENT DOCUMENTS

CN    104407769    3/2015
CN    105320509    2/2016
(Continued)

OTHER PUBLICATIONS

WIPO, International Search Report and Written Opinion for PCT/CN2021/073054, dated Apr. 21, 2021.
(Continued)

*Primary Examiner* — Mahelet Shiberou
(74) *Attorney, Agent, or Firm* — Hodgson Russ LLP

(57) ABSTRACT

Disclosed is an image editing method, a storage medium, and a terminal device. The image editing method includes receiving an image editing command for a target image in a photo album, and displaying an image editing function interface; wherein the image editing function interface includes an image editing application library; determining a target image editing application in the image editing application library; and opening an image editing interface corresponding to the target image editing application, and displaying the target image in the image editing interface.

18 Claims, 9 Drawing Sheets

(51) Int. Cl.
*G06F 3/04842* (2022.01)
*G06F 3/04845* (2022.01)
*G06F 9/451* (2018.01)
*G06F 16/54* (2019.01)

(56) References Cited

U.S. PATENT DOCUMENTS

| | | | |
|---|---|---|---|
| 10,705,697 B2* | 7/2020 | Kusumoto | G06F 3/0488 |
| 2012/0301023 A1 | 11/2012 | Braun et al. | |
| 2014/0071045 A1* | 3/2014 | Muchnick | G06T 11/60 |
| | | | 345/156 |
| 2017/0300890 A1 | 10/2017 | Wereski | |
| 2018/0165105 A1* | 6/2018 | Lu | G06F 9/451 |
| 2020/0311997 A1* | 10/2020 | Takeyama | H04N 1/00196 |

FOREIGN PATENT DOCUMENTS

| | | |
|---|---|---|
| CN | 105654533 | 6/2016 |
| CN | 109460521 | 3/2019 |
| CN | 109597550 | 4/2019 |
| CN | 110061908 | 7/2019 |
| CN | 110634102 | 12/2019 |
| CN | 110704377 | 1/2020 |
| CN | 111340916 | 6/2020 |
| EP | 3144793 | 3/2017 |

OTHER PUBLICATIONS

CNIPA, First Office Action for CN Application No. 202010190562.2, dated Jan. 18, 2023.
CNIPA, Second Office Action for CN Application No. 202010190562.2, dated May 16, 2023.
CNIPA, Rejection Decision for CN Application No. 202010190562.2, dated Jul. 28, 2023.
EPO, Extended European Search Report for EP Application No. 21772156.2, dated Sep. 5, 2023.

* cited by examiner

IMAGE EDITING METHOD, STORAGE MEDIUM, AND TERMINAL DEVICE

CROSS REFERENCE

The present application is a continuation of International Patent Application No. PCT/CN2021/073054, filed Jan. 21, 2021, which claims priority to Chinese Patent Application No. 202010190562.2, filed Mar. 18, 2020, the entire disclosures of which are incorporated herein by reference in their entireties.

TECHNICAL FIELD

The present disclosure relates to the field of computer technologies, and in particular to an image editing method, a storage medium, and a terminal device.

BACKGROUND

The description of the Background section in the present disclosure is about related art of the present disclosure, and is only intended to illustrate and facilitate understanding of the content of the present disclosure. It should not be construed or presumed that the Applicant expressly believes the Background section herein to be the prior art of the present disclosure at the effective filing date.

When retouching the photos stored in the system album, the user may use some retouching functions that come with the album, or with the help of other retouching software. When using other software for retouching, the user usually exits from the album application and finds the retouching software on the desktop, launches the retouching software to enter the main interface, and selects retouching controls.

SUMMARY OF THE DISCLOSURE

The present disclosure provides an image editing method, a storage medium, and a terminal device.

In a first aspect, the present disclosure provides an image editing method, including: receiving an image editing command which is inputted for a target image in a photo album, and displaying an image editing function interface; wherein the image editing function interface includes an image editing application library; determining a target image editing application in the image editing application library; and opening an image editing interface corresponding to the target image editing application, and displaying the target image in the image editing interface.

In a second aspect, the present disclosure provides a computer-readable storage medium, storing a computer program; wherein the computer program is executable by a processor to perform the above method.

In a third aspect, the present disclosure provides a terminal, including a memory, a processor, and a computer program stored in the memory and executable by the processor; wherein the computer program is executable by the processor to perform the above method.

BRIEF DESCRIPTION OF THE DRAWINGS

In order to more clearly illustrate the technical solutions in the embodiments or related art of the present disclosure, the following is a brief description of the drawings required to be used in the description of the embodiments or related art. It is clear that the drawings in the following description are only some embodiments of the present disclosure, and other drawings can be obtained from these drawings without creative effort by those skilled in the art.

DETAILED DESCRIPTION

The technical solutions in the embodiments of the present disclosure will be clearly and completely described below in conjunction with the accompanying drawings in the embodiments of the present disclosure. Obviously, the embodiments described are only a part of the embodiments of the present disclosure, and not all of them. Based on the embodiments in the present disclosure, all other embodiments obtained by those skilled in the art without making creative labor fall within the scope of the present disclosure.

In the description of the present disclosure, it is to be understood that the terms "first", "second", etc. are intended for descriptive purposes only and are not to be construed as indicating or implying relative importance. In the description of the present disclosure, it is to be noted that, unless otherwise expressly specified and limited, the words "include" and "have", and any variations thereof, are intended to cover non-exclusive inclusion. For example, a process, method, system, product, or apparatus including a series of steps or units is not limited to the listed steps or units, but optionally further includes steps or units not listed, or optionally further includes other steps or units inherent to such process, method, product, or apparatus. To those skilled in the art, the specific meaning of the above terms in the context of the present disclosure may be understood on a case-by-case basis. In addition, in the description of the present disclosure, "plurality" means two or more unless otherwise specified. "and/or", describing an association of associated objects, indicates that three relationships may exist. For example, A and/or B may indicate: the presence of A alone, the presence of both A and B, and the presence of B alone. The character "l" generally indicates that the associated objects before and after is in an "or" relationship.

The image editing method provided by embodiments of the present disclosure will be described in detail below in conjunction with the accompanying FIGS. 1-6.

Figure 1:
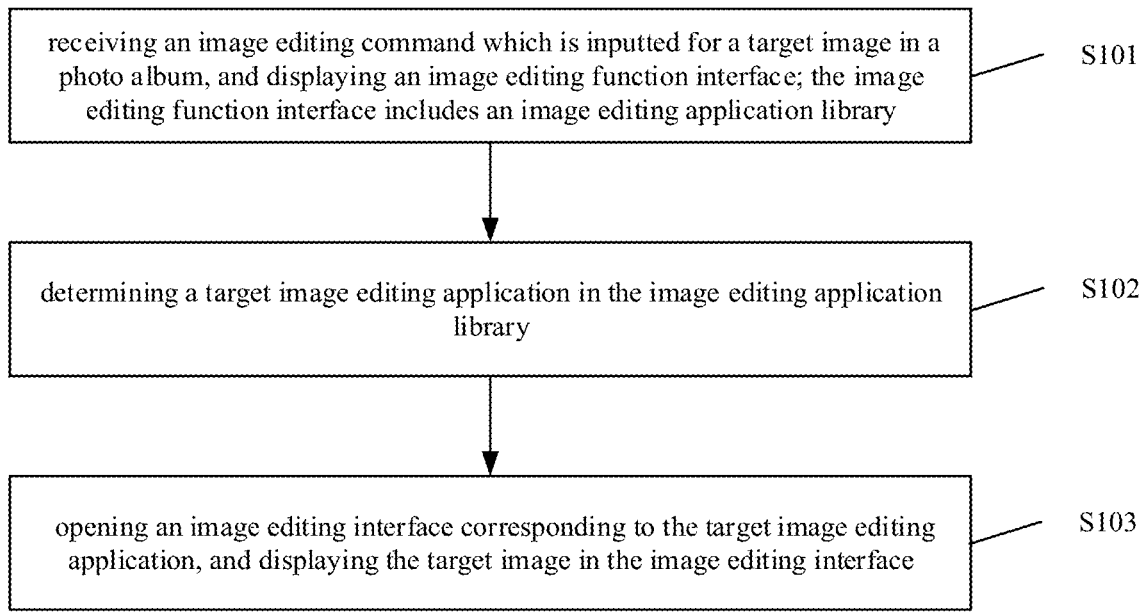
FIG. 1 is a flowchart of an image processing method according to an embodiment of the present disclosure.

Referring to FIG. 1, FIG. 1 is a flowchart of an image processing method according to an embodiment of the present disclosure.

As shown in FIG. 1, the method described in the embodiment of the present disclosure may include operations at blocks illustrated herein.

At block S101: receiving an image editing command which is inputted for a target image in a photo album, and displaying an image editing function interface; the image editing function interface includes an image editing application library.

When editing the target image in an album application, after entering the image editing function interface of the album application by long-pressing the target image or by clicking a function key, the user may choose on the interface to adjust the target image by means of an editing function that comes with the album application or choose on the interface to process the target image by means of an image editing application other than the album application, i.e., an image editing application in the image editing application library.

Compared with the image editing function of the system's album application, the professional image editing application has more comprehensive and perfect image editing functions, and the user can get better images by the image editing application. In the embodiment, an image editing application library button is added to the image editing function interface of the album application, such that the user may jump directly from the current application to the professional image editing application.

When performing image editing, a single image may be selected or multiple images may be selected in batch for unified processing. The image editing application library on the image editing function interface may include all the image editing applications contained in the terminal or only some of the image editing applications.

In addition to retouching functions that comes with the applications in the image editing application library, the image editing function interface may further include some general functions such as simulcast, sending and printing. In particular, when choosing to use another image editing application for retouching, the user may send the target image to a target image editing application via the "sending" function.

In other implementations, when the target image is displayed as a thumbnail image, the user may access the image editing function interface through a relevant operation.

At block S102: determining a target image editing application in the image editing application library.

On the image editing function interface, the editing function buttons and the buttons of the image editing application may be displayed in different forms for easy differentiation. For example, the buttons may be displayed with different background pictures, or the function buttons are placed on separate pages from the application buttons, etc.

In addition to the image editing function buttons, the image editing function interface of the target image may include only one image editing application icon: the image editing application library, under which all available image editing applications contained in the terminal may be placed. After clicking to open the image editing application library, the user may select an image editing application in this library to edit the target image, and the selected image editing application is the target image editing application.

Figure 2:
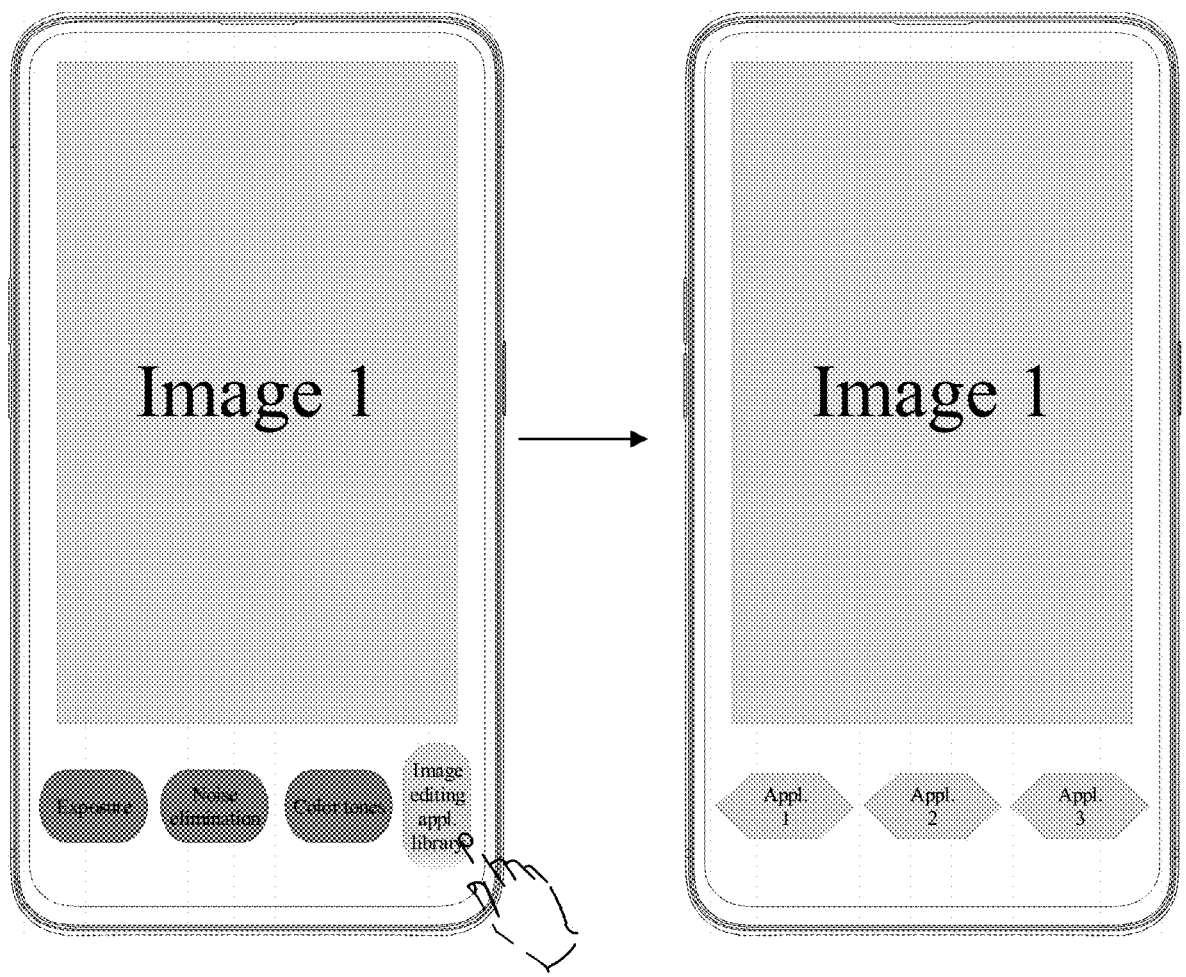
FIG. 2 is an interface schematic view of an image processing function according to an embodiment of the present disclosure.

As shown in FIG. 2, the left figure is the image editing function interface corresponding to the application in which an image 1 is located, the interface includes three image editing functions: exposure, noise elimination, and color tones, as well as the image editing application library sidebar. When the user chooses to use another image editing application for retouching, he/she may click the sidebar to cause a display of the interface as shown in the right figure. Among the three image editing applications (abbreviated as Application 1, Application 2 and Application 3 in the figure) shown in the right interface, the user may choose one to retouch the target image.

In other implementations, multiple image editing applications may also be individually displayed on the image editing function interface of the target image.

At block S103: opening an image editing interface corresponding to the target image editing application, and displaying the target image in the image editing interface.

The user may activate the target image editing application by manually clicking on it and access to the image editing interface corresponding to the target image editing application, or directly access to the image editing interface corresponding to the target image editing application through a series of simulated operations of the terminal.

After the target image is displayed in the interface, the target image is edited by filter, cutout, sticker and other functions provided in the interface.

The above method provided by the present disclosure is not only applicable to applications such as system photo album, but also can be applied to image editing applications developed by developers. The image editing interface of the image editing application may also include buttons for other image editing applications, such that the user may quickly switch from the current application to another image editing application.

The image editing method provided by the above embodiments includes: receiving an image editing command which is inputted for a target image in a photo album, and displaying an image editing function interface; the image editing function interface includes an image editing application library; determining a target image editing application in the image editing application library; and opening an image editing interface corresponding to the target image editing application, and displaying the target image is displayed in the image editing interface. In the embodiments, the option of image editing application library has been added to the image editing function interface corresponding to the photo album (e.g., album application). In this interface, in addition to using the retouching function that comes with the album, the user may also select other retouching applications for retouching through the image editing application library, that is, tap to select the image editing application library and determine a target image editing application in the image editing application library for retouching. The additional button of other retouching applications on the image editing interface facilitates the user to switch directly from the album application to another retouching application, reducing the retouching path and simplifying the operation process, as well as improving the retouching efficiency.

Figure 3:
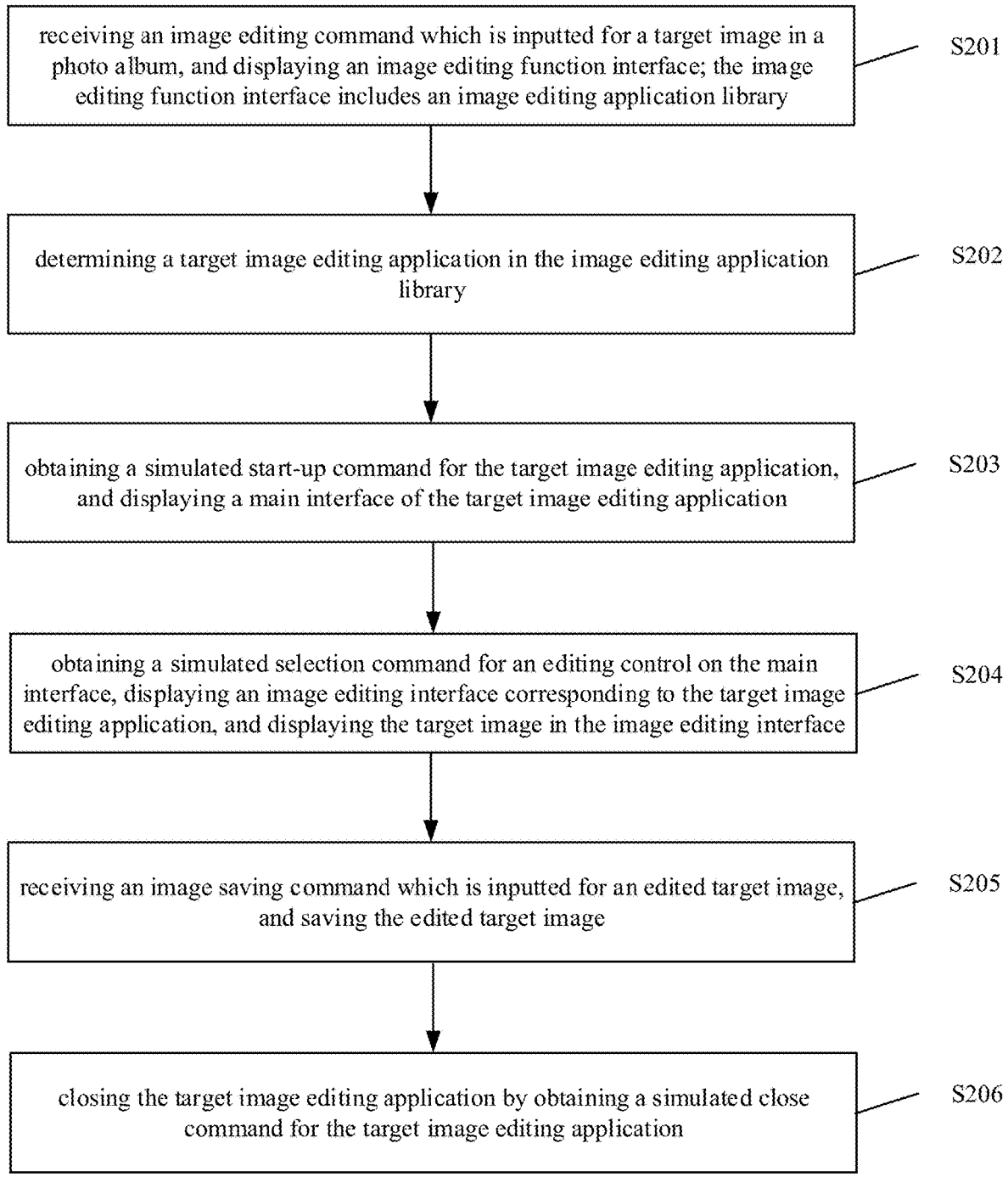
FIG. 3 is a flowchart of an image processing method according to another embodiment of the present disclosure.

Referring to FIG. 3, FIG. 3 is a flowchart of an image processing method according to another embodiment of the present disclosure.

As shown in FIG. 3, the method described in the embodiment of the present disclosure may include operations at blocks illustrated herein.

At block S201: receiving an image editing command which is inputted for a target image in a photo album, and displaying an image editing function interface; the image editing function interface includes an image editing application library.

When editing an image in the photo album (which is defined as a target image), after entering the image editing function interface corresponding to an application in which the target image is located by long-pressing the target image or clicking a function key, the user may choose on the interface to adjust the target image by means of an editing function that comes with the application or choose on the interface to process the target image by means of another image editing application other than the photo album application, i.e., an image editing application in the image editing application library.

The target image may be a single or multiple images, i.e., when performing image editing, the user may select a single image or multiple images in a batch for unified processing. The image editing application library on the image editing function interface includes at least one image editing application.

In addition to retouching functions that comes with the applications in the image editing application library, the image editing feature interface may further include some general features such as slideshow, sharing, and copying. In particular, when choosing to use another image editing application for retouching, the user may send the target image to a target image editing application via the "sharing" function.

Other undescribed details of this step may refer to step S101 and will not be repeated here.

At block S202: determining a target image editing application in the image editing application library.

For further description of this step, reference may be made to step S102, which will not be repeated here.

At block S203: obtaining a simulated start-up command for the target image editing application, and displaying a main interface of the target image editing application.

In order to shorten the switching path from the photo album application to the target image editing application and save the user operation process, in the present embodiment, a simulated manual-click is identified to enter from the image editing function interface of the photo album application to the image editing interface corresponding to the target image editing application.

After determining the target image editing application in the image editing application library, the system simulates a click to activate the target image editing application and access the main interface thereof.

At block S204: obtaining a simulated selection command for an editing control on the main interface, displaying an image editing interface corresponding to the target image editing application, and displaying the target image in the image editing interface.

Generally, the main interface of the image editing application includes several different sections. To access the image editing interface from the main interface, it is also necessary to click on a relevant control on the main interface.

Figure 4:
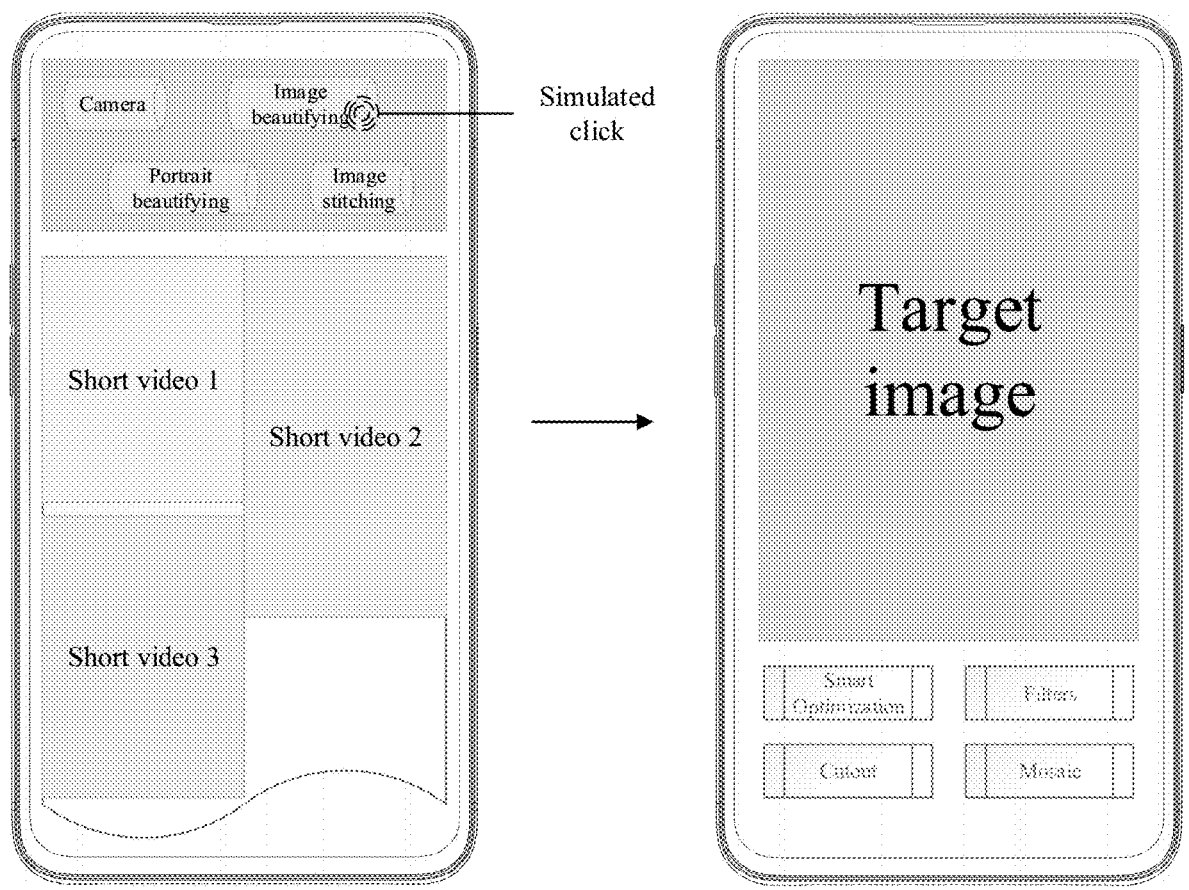
FIG. 4 is a schematic view of a simulated operation of a main interface of an image editing application according to an embodiment of the present disclosure.

As shown in FIG. 4, the main interface of the target image editing application includes an image editing section (where controls of camera, image beautifying, portrait beautifying, and image stitching are located) and a beauty-tips sharing section (where short videos are located). When entering the main interface by simulating a click, the terminal is further required to simulate a click on the "portrait beautifying" control in the image editing section of the interface to enter the image editing interface shown on the right for subsequent editing of the target image.

Of course, in a case where the target image editing application selected by the user can enter the image editing interface directly after being activated, the step of obtaining a simulated selection command may be omitted. In this case, an operation to be performed by the terminal is: obtaining a simulated start-up command for the target image editing application, displaying an image editing interface corresponding to the target image editing application, and displaying the target image in the image editing interface.

At block S205: receiving an image saving command which is inputted for an edited target image, and saving the edited target image.

After finishing the editing of the target image on the target image editing application, the user may want to save the edited target image, and the edited target image may be stored in the original location of the target image or stored in the target image editing application.

After the terminal receives the saving command and executes the saving operation, the terminal may send feedback information to the user, for example, a text message such as a successful save, or vibration feedback, etc.

In some embodiments, the edited target image may overwrite the original target image to save storage space.

At block S206: closing the target image editing application by obtaining a simulated close command for the target image editing application.

After the edited target image is saved successfully, the terminal may close the target image editing application by simulating a click action and return to the application where the target image was previously located.

The simulated click to close the target image editing application shortens the path between the target image editing application and the photo album, while reducing user operations. Clicking to open and close the target image editing application and to enter the image editing interface corresponding to the target image editing application by means of simulation greatly improves the efficiency of user's retouching.

In other embodiments, after simulating the closing of the target image editing application, the method may further include returning to a system desktop or returning to the photo album to view the saved edited target image.

It should be noted that, in a case where the user chooses to exit the image editing interface corresponding to the target image editing application during the editing process of the target image, the terminal may return directly to the image editing function interface through a simulated operation, and the user may reselect an image editing application to be used in the image editing function interface.

The image editing method provided in the embodiments includes: receiving, by a terminal, an image editing command which is inputted for a target image in a photo album, and displaying an image editing function interface; the image editing function interface includes an image editing application library; determining a target image editing application in the image editing application library; obtaining a simulated start-up command for the target image editing application, and displaying a main interface of the target image editing application; obtaining a simulated selection command for an editing control on the main interface, displaying an image editing interface corresponding to the target image editing application, and displaying the target image in the image editing interface; receiving an image saving command which is inputted for the edited target image, and saving the edited target image; and closing the target image editing application by obtaining a simulated close command for the target image editing application. In the embodiments, in addition to adding the option of image editing application library on the image editing function interface corresponding to the application where the photo album is located, it is also allowed to open the target image editing application by simulated clicking and directly access to the image editing interface corresponding to the target image editing application when the user selects another retouching application, for a subsequent retouching of images. The simulated manual-click may eliminate the manual operation when switching from the album app to another retouching app, thereby reducing the app switching time and improving the retouching experience.

Figure 5:
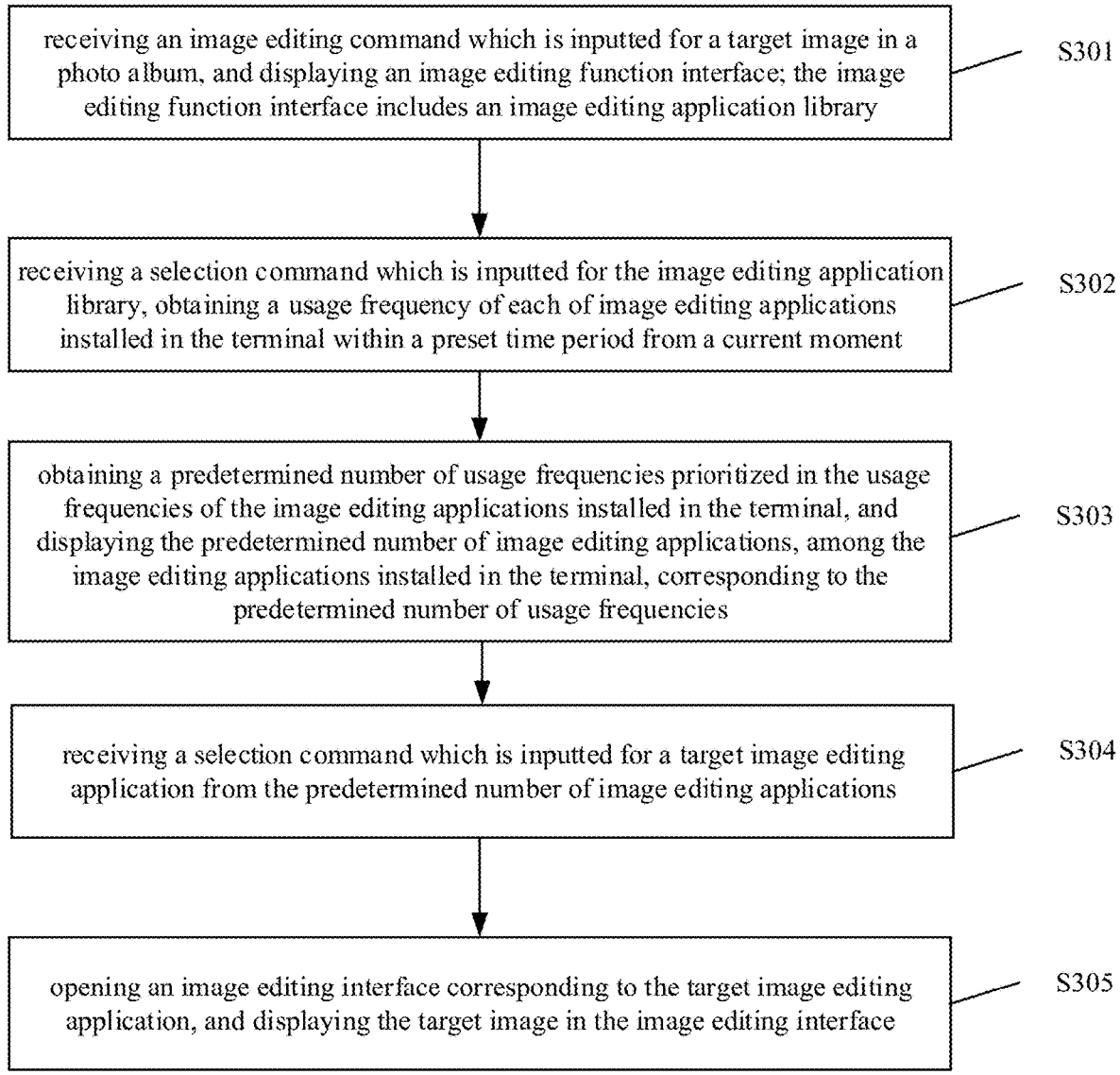
FIG. 5 is a flowchart of an image processing method according to further another embodiment of the present disclosure.

Referring to FIG. 5, FIG. 5 is a flowchart of an image processing method according to further another embodiment of the present disclosure.

As shown in FIG. 5, the method described in the embodiment of the present disclosure may include operations at blocks illustrated herein.

At block S301: receiving an image editing command which is inputted for a target image in a photo album, and displaying an image editing function interface; the image editing function interface includes an image editing application library.

When editing the target image in an album application, after entering the image editing function interface of the album application by long-pressing the target image or by clicking a function key, the user may choose on the interface to adjust the target image by means of an editing function that comes with the album application or choose on the interface to process the target image by means of an image editing application other than the album application, i.e., an image editing application in the image editing application library.

Compared with the image editing function of the system's album application, the professional image editing application has more comprehensive and perfect image editing functions, and the user can get better images by the image editing application. In the embodiment, an image editing application library button is added to the image editing function interface of the album application, such that the user may jump directly from the current application to the professional image editing application.

When performing image editing, a single image may be selected or multiple images may be selected in batch for unified processing. The image editing application library on the image editing function interface may include all the image editing applications contained in the terminal or only some of the image editing applications.

In addition to retouching functions that comes with the applications in the image editing application library, the image editing function interface may further include some general functions such as simulcast, sending and printing. In particular, when choosing to use another image editing application for retouching, the user may send the target image to a target image editing application via the "sending" function.

In other implementations, when the target image is displayed as a thumbnail image, the user may access the image editing function interface through a relevant operation.

At block S302: receiving a selection command which is inputted for the image editing application library, obtaining a usage frequency of each of image editing applications installed in the terminal within a preset time period from a current moment.

In the embodiment, the image editing applications in the image editing application library are not fixed but variable. According to the image editing applications contained in the terminal and the usage frequency of each image editing application, the image editing applications in the image editing application library are constantly changing.

When an image editing application is displayed in the form of a collection on the image editing function interface of the target image, after the user clicks on a button for selecting the image editing application library on the interface, the terminal obtains the usage frequency of each installed image editing application and performs a subsequent operation.

The usage frequency refers to a frequency of use of an image editing application within a preset time period from the current moment, for example, an image editing application has been used a certain number of times within seven days.

In other embodiments, the usage frequency of the image editing application may be a frequency of use from the moment of installation to the current moment.

At block S303: obtaining a predetermined number of usage frequencies prioritized in the usage frequencies of the image editing applications installed in the terminal, and displaying the predetermined number of image editing applications, among the image editing applications installed in the terminal, corresponding to the predetermined number of usage frequencies.

All the installed image editing applications are sorted by the corresponding usage frequency, and the predetermined number of image editing applications in the top ranking are displayed on the image editing function interface of the target image. In a case where there are seven image editing applications installed in the terminal, three image editing applications with greatest usage frequencies in a week among these seven applications may be displayed on the image editing function interface of the target image.

In an implementation, the three image editing applications may be displayed on the image editing function interface of the target image in the order of the usage frequencies.

Figure 6:
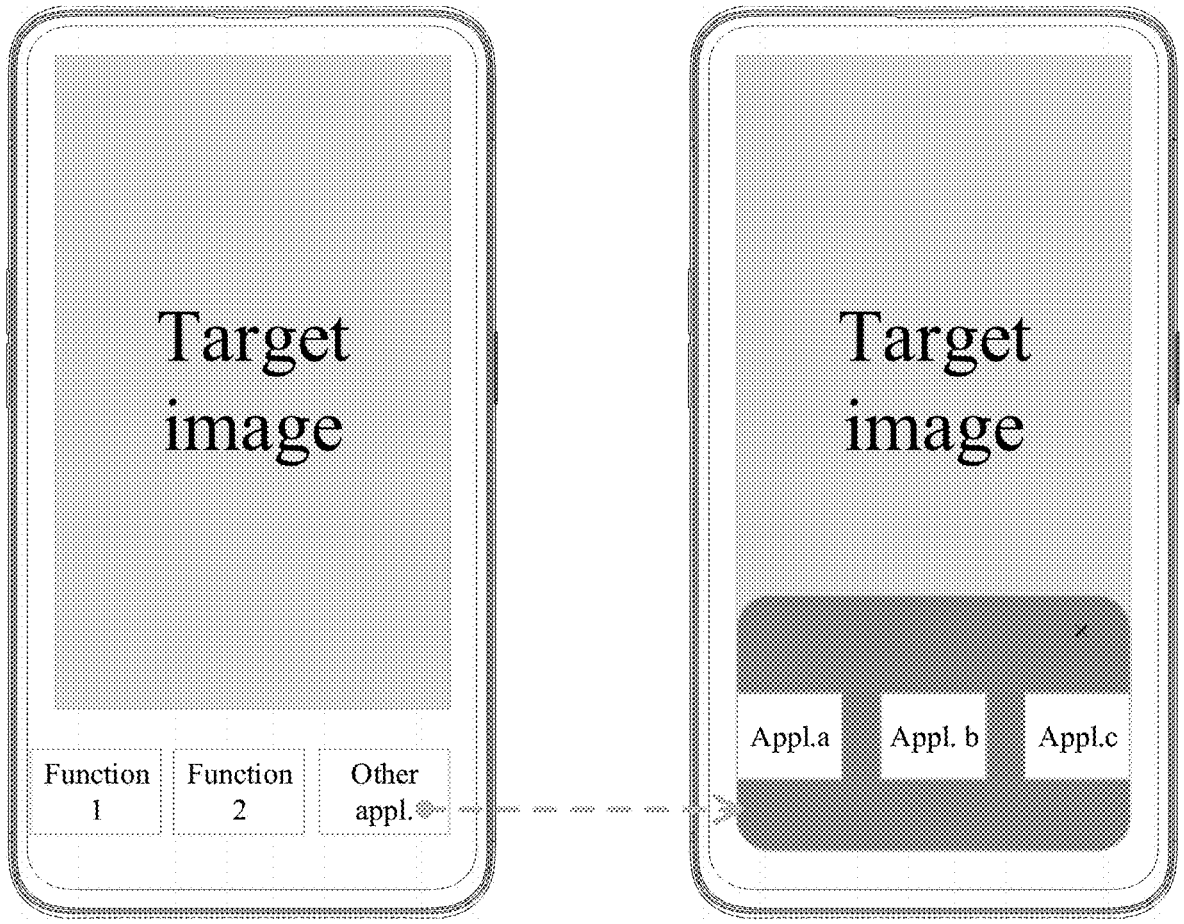
FIG. 6 is a schematic view of displaying an image editing application according to an embodiment of the present disclosure.

FIG. 6 is a schematic view of displaying an image editing application according to an embodiment of the present disclosure.

The image editing function interface shown in this figure displays the three image editing applications in a semi-popup window in the order of the usage frequencies from left to right.

The image editing applications in the image editing application library may be displayed on either form of window.

At block S304: receiving a selection command which is inputted for a target image editing application from the predetermined number of image editing applications.

After an application is selected as the target image editing application among the displayed image editing applications, the following steps are performed.

At block S305: opening an image editing interface corresponding to the target image editing application, and displaying the target image in the image editing interface.

The user may activate the target image editing application by manually clicking on it and access to the image editing interface corresponding to the target image editing application, or directly access to the image editing interface corresponding to the target image editing application through a series of simulated operations of the terminal.

After the target image is displayed in the interface, the target image is edited by cropping, mosaic, polishing and other functions provided in the interface.

The above image editing method provided in the embodiments includes: receiving an image editing command which is inputted for a target image in a photo album, and displaying an image editing function interface; the image editing function interface includes an image editing application library; receiving a selection command which is inputted for the image editing application library, and displaying each image editing application in the image editing application library; receiving a selection command which is inputted for a target image editing application from the each image editing application, and determining the target image editing application; and opening an image editing interface corresponding to the target image editing application, and displaying the target image in the image editing interface. In the embodiments, the image editing applications in the image editing application library may be displayed on the window in order of their respective usage frequencies, and the image editing applications are sorted based on usage frequency to facilitate the user to select the most commonly used image editing applications in the fastest manner.

The following is an embodiment of an apparatus of the present disclosure that can be used to perform the method embodiments of the present disclosure. For details not disclosed in the apparatus embodiment, reference may be made to the method embodiments.

Figure 7:
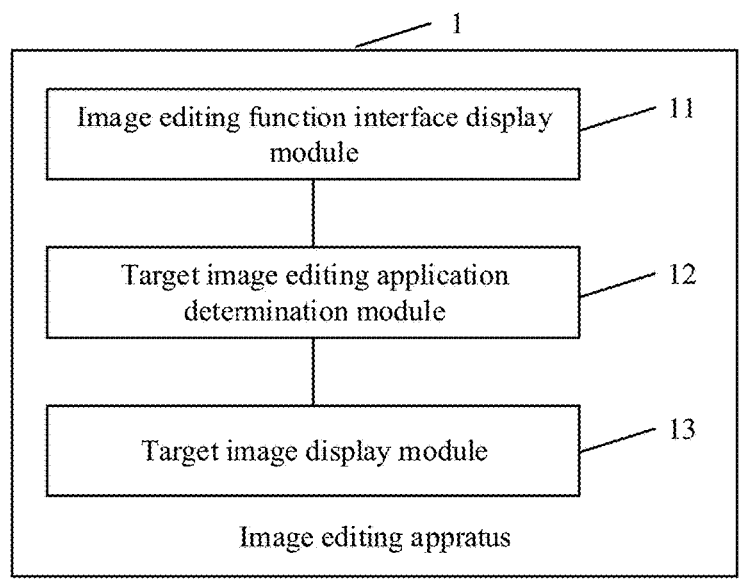
FIG. 7 is a structural schematic view of an image editing apparatus according to an embodiment of the present disclosure.

Referring to FIG. 7, FIG. 7 is a structural schematic view of an image editing apparatus according to an embodiment of the present disclosure. The image editing apparatus may be implemented as all or part of a terminal by software, hardware, or a combination of both, and may also be integrated as a stand-alone module on a server. The image editing apparatus 1 herein is applied to a terminal, including an image editing function interface display module 11, a target image editing application determination module 12, and a target image display module 13.

The image editing function interface display module 11 is configured to receive an image editing command which is inputted for a target image in a photo album, and display an image editing function interface; the image editing function interface includes an image editing application library.

The target image editing application determination module 12 is configured to determine a target image editing application in the image editing application library.

The target image display module 13 is configured to open an image editing interface corresponding to the target image editing application, and displaying the target image in the image editing interface.

Figure 8:
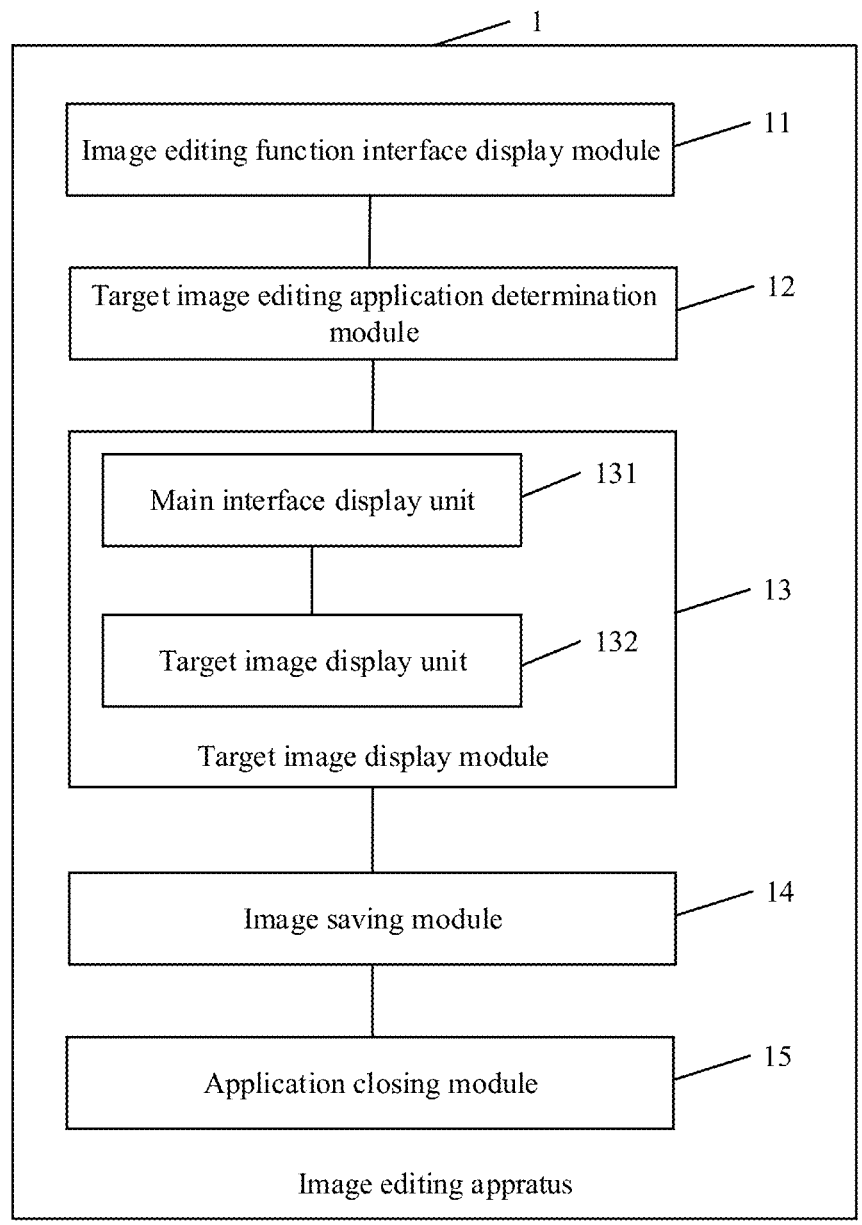
FIG. 8 is a structural schematic view of an image editing apparatus according to another embodiment of the present disclosure.

Referring to FIG. 8, FIG. 8 is a structural schematic view of an image editing apparatus according to another embodiment of the present disclosure.

In some embodiments, as shown in FIG. 8, the target image display module 13 in the image editing apparatus 1 may include components as followed.

A main interface display unit 131, configured to obtain a simulated start-up command for the target image editing application, and display a main interface of the target image editing application.

A target image display unit 132, configured to obtain a simulated selection command for an editing control on the main interface, display an image editing interface corresponding to the target image editing application, and display the target image in the image editing interface.

The apparatus 1 further include components as followed.

An image saving module 14, configured to receive an image saving command which is inputted for the edited target image, and save the edited target image.

An application closing module 15, configured to close the target image editing application by obtaining a simulated close command for the target image editing application.

Figure 9:
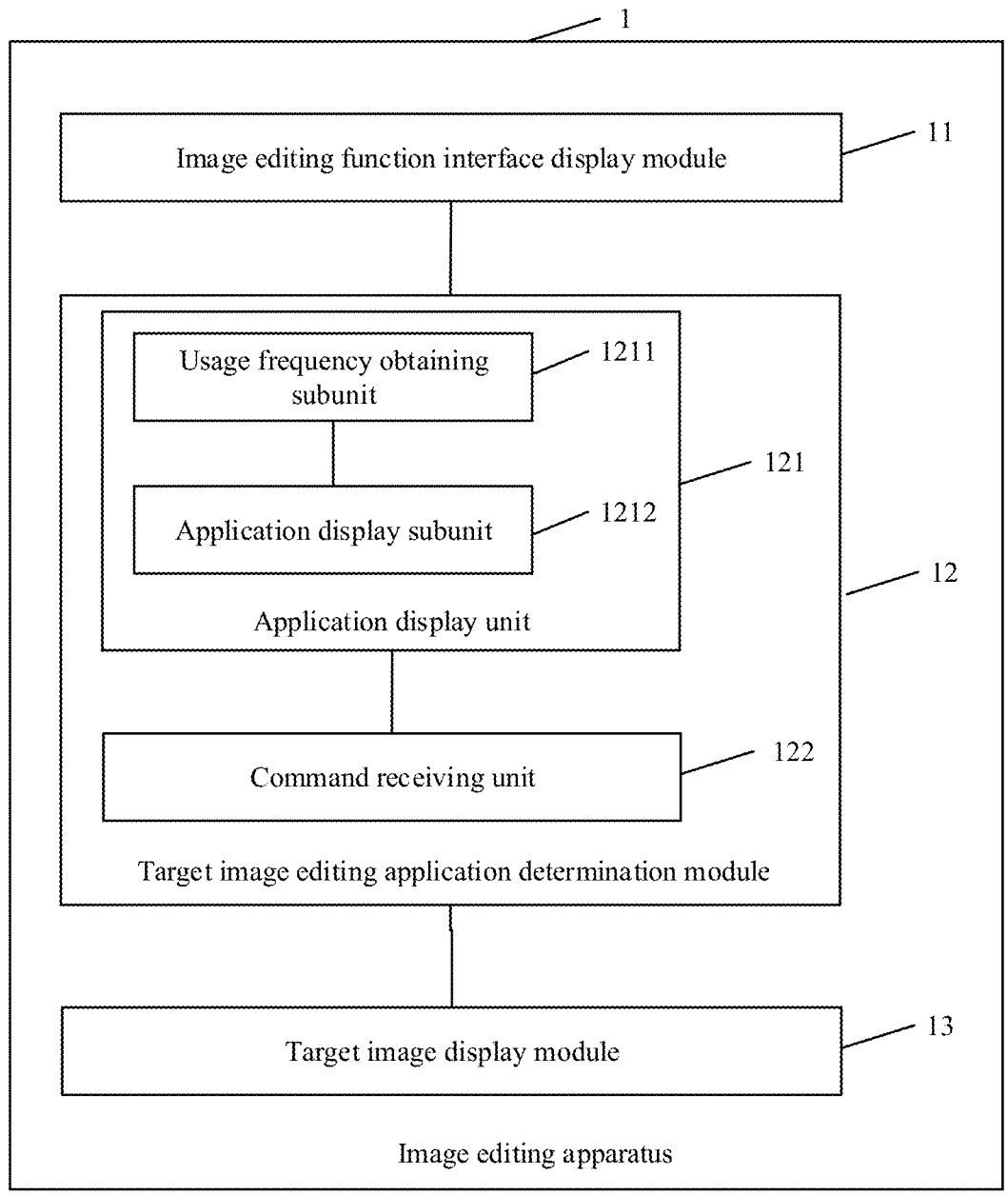
FIG. 9 is a structural schematic view of an image editing apparatus according to further another embodiment of the present disclosure.

Referring to FIG. 9, FIG. 9 is a structural schematic view of an image editing apparatus according to further another embodiment of the present disclosure.

In some embodiments, as shown in FIG. 9, the target image editing application determination module 12 in the image editing apparatus 1 may include components as followed.

An application display unit 121, configured to receive a selection command which is inputted for the image editing application library, and display each image editing application in the image editing application library.

A command receiving unit 122, configured to receive a selection command which is inputted for a target image editing application from the each image editing application.

In other embodiments, the application display unit 121 further includes components as followed.

A usage frequency obtaining subunit 1211, configured to receive a selection command which is inputted for the image editing application library, obtain a usage frequency of each of image editing applications installed in the terminal within a preset time period from a current moment.

An application display subunit 1212, configured to obtain a predetermined number of usage frequencies prioritized in the usage frequencies of the image editing applications installed in the terminal, and display the predetermined number of image editing applications, among the image editing applications installed in the terminal, corresponding to the predetermined number of usage frequencies.

In some embodiments, the application display subunit 1212 is further configured to perform the following operations.

Obtaining the predetermined number of usage frequencies prioritized in the usage frequencies of the image editing applications installed in the terminal, and displaying each of the predetermined number of image editing applications in order of a corresponding usage frequency.

Or, displaying each of the predetermined number of image editing applications in order of a corresponding usage frequency in a semi-pop-up window.

It should be noted that the image editing apparatus provided in the above embodiments performs the image editing method by dividing the above-mentioned functional modules for example only. In practice, the above-mentioned functions may be assigned to different functional modules as needed, i.e., the internal structure of the apparatus is divided into different functional modules to perform all or some of the above-mentioned functions. In addition, the image editing apparatus belongs to the same idea as the image editing method embodiments, and its implementation process is detailed in the method embodiments, which will not be repeated here.

The above embodiments of the present disclosure are numbered for the purpose of description only and do not represent the advantages or disadvantages of the embodiments.

The image editing apparatus provided by the above embodiments may perform: receiving an image editing command which is inputted for a target image in a photo album, and displaying an image editing function interface; the image editing function interface includes an image editing application library; determining a target image editing application in the image editing application library; and opening an image editing interface corresponding to the target image editing application, and displaying the target image is displayed in the image editing interface. In the embodiments, the option of image editing application library has been added to the image editing function interface corresponding to the photo album (e.g., album application). In this interface, in addition to using the retouching function that comes with the album, the user may also select other retouching applications for retouching through the image editing application library, that is, tap to select the image editing application library and determine a target image editing application in the image editing application library for retouching. The additional button of other retouching applications on the image editing interface facilitates the user to switch directly from the album application to another retouching application, reducing the retouching path and simplifying the operation process, as well as improving the retouching efficiency.

Embodiments of the present disclosure further provide a computer-readable storage medium storing a computer program that implements the steps of the method of any of the preceding embodiments when executed by a processor. The computer-readable storage medium may include, but is not limited to, any type of disk, including floppy disk, optical disk, DVD, CD-ROM, micro-drive and magnetic disk, ROM, RAM, EPROM, EEPROM, DRAM, VRAM, flash memory device, magnetic or optical card, nano-system (including molecular memory IC), or any type of medium or device suitable for storing instructions and/or data.

Embodiments of the present disclosure further provide a terminal including a memory, a processor, and a computer program stored in the memory and executable by the processor. The processor can execute the program to implement the steps of the method of any of the above embodiments.

Figure 10:
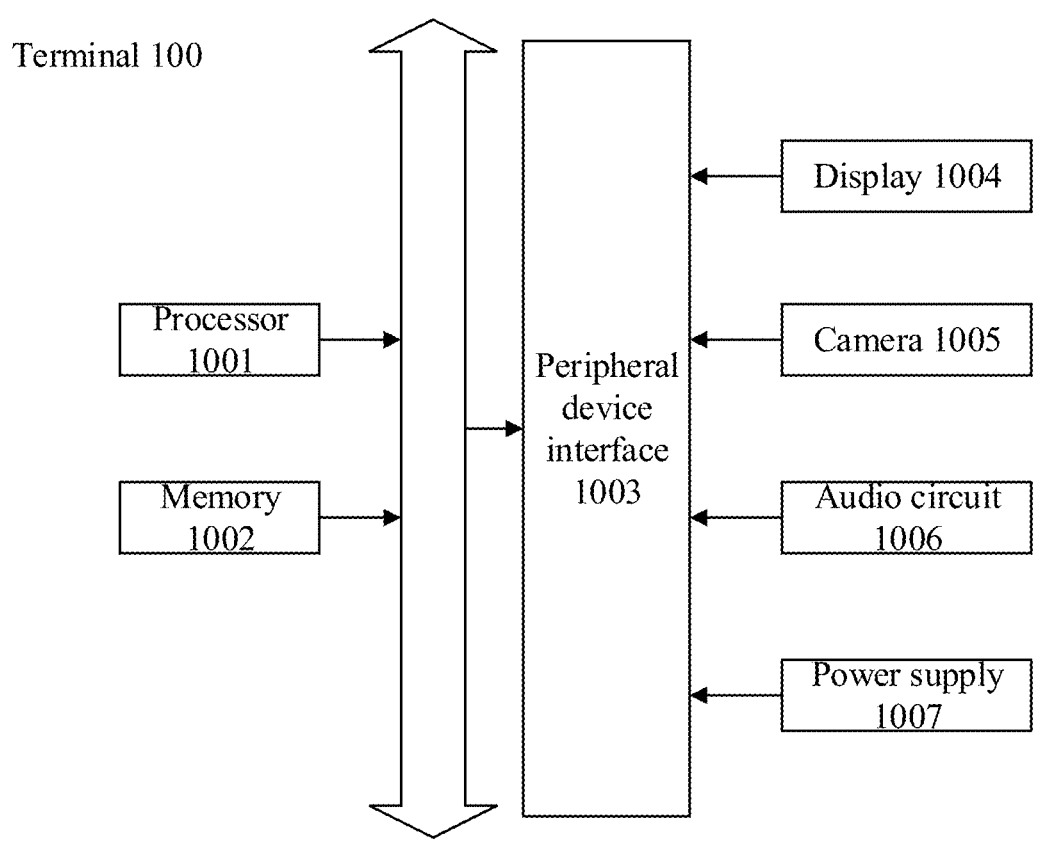
FIG. 10 is a structural block view of a terminal according to an embodiment of the present disclosure.

Referring to FIG. 10, FIG. 10 is a structural block view of a terminal according to an embodiment of the present disclosure.

As shown in FIG. 10, the terminal 100 includes a processor 1001 and a memory 1002.

In the embodiment, the processor 1001 is a control center of the computer system and may be a processor of a physical machine or a processor of a virtual machine. The processor 1001 may include one or more processing cores, such as a 4-core processor, an 8-core processor, etc. The processor 1001 may be implemented by at least one hardware form of digital signal processing (DSP), field-programmable gate array (FPGA), and programmable logic array (PLA). The processor 1001 may include a main processor for processing data in a wakeup state, also referred to as a central processing unit (CPU), and a co-processor, which is a low-power processor for processing data in a standby state.

The memory 1002 may include one or more computer-readable storage medium, which may be non-transitory. The memory 1002 may include high-speed random-access memory, and non-volatile memory, such as one or more disk storage devices, flash memory storage devices. In some embodiments of the present disclosure, the non-transitory computer-readable storage medium in the memory 1002 is configured to store at least one instruction to be executed by the processor 1001 to implement the method in the embodiments of the present disclosure.

In some embodiments, the terminal 100 further includes: a peripheral device interface 1003 and at least one peripheral device. The processor 1001, the memory 1002, and the peripheral device interface 1003 may be connected to each other via a bus or signal line. Each peripheral device may be connected to the peripheral device interface 1003 via a bus, signal line, or circuit board. Specifically, the peripheral device includes at least one of: a display 1004, a camera 1005, and an audio circuit 1006.

The peripheral device interface 1003 may be configured to connect at least one peripheral device related to input/output (I/O) to the processor 1001 and the memory 1002. In some embodiments of the present disclosure, the processor 1001, the memory 1002, and the peripheral device interface 1003 are integrated on the same chip or circuit board; in other embodiments of the present disclosure, any one or two of the processor 1001, the memory 1002, and the peripheral device interface 1003 may be implemented on separate chips or circuit boards. Embodiments of the present disclosure are not specifically limited in this regard.

The display 1004 is configured to display a user interface (UI). The UI may include graphics, text, icons, video, and any combination thereof. When the display 1004 is a touch display, the display 1004 further has the ability to capture a touch signal on or above the surface of the display 1004. The touch signal may be input to the processor 1001 for processing as a control signal. In addition, the display 1004 may further be configured to provide a virtual button and/or a virtual keyboard, also referred to as a soft button and/or a soft keyboard. In some embodiments of the present disclosure, the number of the display 1004 may be one, and the display 1004 is arranged on the front panel of the terminal 1000; in other embodiments of the present disclosure, the number of the displays 1004 may be at least two, each arranged on a different surface of the terminal 1000 or in a folded design; in further embodiments of the present disclosure, the display 1004 may be a flexible display, arranged on a curved surface or a folded surface. Moreover, the display 1004 may be arranged in a non-rectangular irregular shape, i.e., an irregular screen. The display 1004 may be prepared using materials such as liquid crystal display (LCD), organic light-emitting diode (OLED), etc.

The camera 1005 is configured to capture images or videos. In some embodiments, the camera 1005 includes a front camera and a rear camera. Typically, the front camera is arranged on a front panel of the terminal and the rear camera is arranged on a back of the terminal. In some embodiments, the number of the rear cameras is at least two, and each of the rear cameras includes any one of main camera, depth-of-field camera, wide-angle camera, and telephoto camera, to achieve the background bokeh function by fusing the main camera and the depth-of-field camera, the panorama shooting the virtual reality (VR) shooting function by fusing the main camera and the wide-angle camera, etc. In some embodiments of the present disclosure, the camera 1005 may further include a flash. The flash may be a single-color temperature flash or a dual-color temperature flash. A dual color temperature flash is a combination of a warm light flash and a cool light flash that can be used to compensate for light at different color temperatures.

The audio circuit 1006 may include a microphone and a speaker. The microphone is configured to capture sound waves from the user and the environment, and convert the sound waves into electrical signals for input to the processor 1001 for processing. For the purpose of stereo sound capture or noise reduction, the microphone may be a plurality of microphones, each arranged in a different part of the terminal 100. The microphones may also be array microphones or omnidirectional acquisition type microphones.

A power supply 1007 is configured to power various components in the terminal 100. The power supply 1007 may be AC, DC, disposable batteries, or rechargeable batteries. When the power supply 1007 includes a rechargeable battery, the rechargeable battery may be a wired rechargeable battery or a wireless rechargeable battery. A wired rechargeable battery is charged via a wired line, and a wireless rechargeable battery is charged via a wireless coil. The rechargeable battery may support fast charging technology.

The block diagram of the terminal structure illustrated in embodiments of the present disclosure does not constitute a limitation of the terminal 100, and the terminal 100 may include more or fewer components than illustrated, or a combination of certain components, or a different arrangement of components.

In this disclosure, the terms "first", "second", etc. are intended for descriptive purposes only and are not to be construed as indicating or implying relative importance or order; the term "plurality" refers to two or more, unless otherwise expressly qualified. The terms "mounted", "connected", "coupled", "fixed", etc. are to be understood in a broad sense. For example, "connected" may be a fixed connection, a removable connection, or a one-piece connection; "coupled" may be a direct connection or an indirect connection through an intermediary. For those skilled in the art, the specific meaning of the above terms in the context of the present disclosure can be understood on a case-by-case basis.

In the description of the present disclosure, it is to be understood that the terms "up", "down", etc. indicate an orientation or positional relationship based on the orientation or positional relationship shown in the accompanying drawings, and are intended only to facilitate and simplify the description of the present disclosure, not to indicate or imply that the device or unit referred to must have a particular orientation, be constructed and operate in a particular orientation, and therefore is not to be construed as a limitation of the present disclosure.

The foregoing is only specific embodiments of the present disclosure, but the scope of the present disclosure is not limited thereto, and any variations or substitutions readily conceivable by those skilled in the art within the technical scope disclosed herein shall be covered by the scope of the present disclosure. Therefore, equivalent changes made in accordance with the claims of the present disclosure are still covered by the scope of the present disclosure.

What is claimed is:

1. An image editing method performed by a terminal, comprising:
   receiving an image editing command for a target image in a photo album, and displaying an image editing function interface; wherein the image editing function interface comprises an image editing application library;
   determining a target image editing application in the image editing application library according to an operation from a user; wherein interfaces of the target image editing application comprise a main interface and an image editing interface, and the main interface is switched to the image editing interface in response to an editing control being selected;
   obtaining a simulated start-up command for the target image editing application, and displaying the main interface of the target image editing application; and
   obtaining a simulated selection command for an editing control on the main interface, displaying the image editing interface corresponding to the target image editing application, and displaying the target image in the image editing interface.

2. The method according to claim 1, further comprising:
   receiving an image saving command for an edited target image, and saving the edited target image; and
   closing the target image editing application by obtaining a simulated close command for the target image editing application.

3. The method according to claim 2, wherein a saving location is an original location of the target image or the target image editing application.

4. The method according to claim 1, wherein determining the target image editing application in the image editing application library comprises:
   receiving a selection command for the image editing application library, and displaying each image editing application in the image editing application library; and
   receiving a selection command for the target image editing application from the each image editing application.

5. The method according to claim 4, wherein receiving the selection command for the image editing application library, and displaying each image editing application in the image editing application library comprises:
   receiving the selection command for the image editing application library, obtaining a usage frequency of each of image editing applications within a preset time period; wherein the image editing applications are installed in a terminal; and
   obtaining a predetermined number of usage frequencies prioritized in the usage frequencies of the image editing applications, and displaying the predetermined number of image editing applications, among the image editing applications, corresponding to the predetermined number of usage frequencies.

6. The method according to claim 5, wherein displaying the predetermined number of image editing applications, among the image editing applications installed in the terminal, corresponding to the predetermined number of usage frequencies comprises:
   displaying each of the predetermined number of image editing applications in order of a corresponding usage frequency.

7. The method according to claim 6, wherein displaying the predetermined number of image editing applications, among the image editing applications installed in the terminal, corresponding to the predetermined number of usage frequencies comprises:
   displaying each of the predetermined number of image editing applications in order of a corresponding usage frequency in a semi-pop-up window.

8. The method according to claim 2, after the closing the target image editing application, further comprising:
   returning to a system desktop; or
   returning to the photo album, and display the edited target image.

9. The method according to claim 1, wherein before receiving the image editing command for the target image in a photo album, the method further comprises:
   displaying the target image as a thumbnail image.

10. The method according to claim 1, wherein after obtaining the simulated start-up command for the target image editing application, and displaying the main interface of the target image editing application, and obtaining the simulated selection command for an editing control on the main interface, displaying the image editing interface corresponding to the target image editing application, and displaying the target image in the image editing interface, the method further comprises:
    determining an exiting operation for the image editing interface corresponding to the target image editing application to simulate a return to the image editing function interface through a simulated operation.

11. The method according to claim 1, further comprising:
in response to receiving a quitting command for the image editing interface corresponding to the target image editing application during an editing process of the target image, switching to display the image editing function interface through a simulated operation.

12. The method according to claim 1, wherein the target image comprises a plurality of images to be processed in batch.

13. The method according to claim 1, wherein:
displaying the main interface of the target image editing application comprises:
full-screen displaying the main interface; and
displaying the image editing interface corresponding to the target image editing application comprises:
full-screen displaying the image editing interface.

14. The method according to claim 1, wherein the main interface comprises an image-editing section and at least one non-image-editing section, and the main interface is switched to the image editing interface in response to an editing control in the image editing section being selected.

15. A non-transitory computer-readable storage medium of a terminal, storing a computer program, wherein the computer program is executable by a processor to perform steps, including:
receiving an image editing command for a target image in a photo album, and displaying an image editing function interface; wherein the image editing function interface comprises an image editing application library;
determining a target image editing application in the image editing application library according to an operation from a user; wherein interfaces of the target image editing application comprise a main interface and an image editing interface, and the main interface is switched to the image editing interface in response to an editing control being selected;
obtaining a simulated start-up command for the target image editing application, and displaying the main interface of the target image editing application; and
obtaining a simulated selection command for an editing control on the main interface, displaying the image editing interface corresponding to the target image editing application, and displaying the target image in the image editing interface.

16. The storage medium according to claim 15, wherein determining the target image editing application in the image editing application library comprises:
receiving a selection command for the image editing application library, and displaying each image editing application in the image editing application library; and
receiving a selection command for the target image editing application from the each image editing application.

17. The storage medium according to claim 16, wherein receiving the selection command for the image editing application library, and displaying each image editing application in the image editing application library comprises:
receiving the selection command for the image editing application library, obtaining a usage frequency of each of image editing applications within a preset time period; wherein the image editing applications are installed in a terminal; and
obtaining a predetermined number of usage frequencies prioritized in the usage frequencies of the image editing applications installed in the terminal, and displaying the predetermined number of image editing applications, among the image editing applications installed in the terminal, corresponding to the predetermined number of usage frequencies.

18. A terminal, comprising:
a memory, a processor, and a computer program stored in the memory and executable by the processor; wherein the computer program is executable by the processor to:
receive an image editing command for a target image in a photo album, and display an image editing function interface, wherein the image editing function interface comprises an image editing application library;
determine a target image editing application in the image editing application library according to an operation from a user; wherein interfaces of the target image editing application comprise a main interface and an image editing interface, and the main interface is switched to the image editing interface in response to an editing control being selected;
obtain a simulated start-up command for the target image editing application, and displaying the main interface of the target image editing application; and
obtain a simulated selection command for an editing control on the main interface, displaying the image editing interface corresponding to the target image editing application, and displaying the target image in the image editing interface.

* * * * *